Patented Dec. 31, 1929

1,741,761

UNITED STATES PATENT OFFICE

WILLIAM H. ENGELS, OF RAHWAY, NEW JERSEY, ASSIGNOR TO MERCK & CO., OF NEW YORK, N. Y., A CORPORATION OF NEW YORK

QUININE COMPOUND AND PROCESS OF MAKING THE SAME

No Drawing. Application filed November 8, 1923. Serial No. 673,460.

Quinine and its salts and derivatives are widely used in the treatment of febrile and infectious conditions. To produce the desired effect it is generally necessary to administer the drug until physiologic saturation is reached, which causes great discomfort in many patients and may even bring about symptoms of deafness and blindness. The extremely bitter taste of most of the quinine compounds also is very objectionable, especially in the treatment of children and persons who are not able to take medicine in capsule or tablet form.

I have now prepared for the first time a new salt of quinine, quinine bisalicylosalicylate, which to a large extent overcomes the aforementioned difficulties. The new product is a white, fluffy microcrystalline powder, of only slightly bitter taste, practically insoluble in water but easily soluble in alcohol, ether and benzol. It melts at 86° to 88° C. and has the composition $C_{20}H_{24}O_2N_2 (C_{14}H_{10}O_5)_2$ corresponding to a molecular weight 840.

Due to its relative insolubility in water the new compound has only a slightly bitter taste and accordingly may readily be administered to children.

I have found by observations that my new compound is well adapted for the treatment of influenza, infections of the nose and throat (generally termed "colds") neuralgia, rheumatic pains, etc. Much smaller doses suffice than would be required with other quinine salts or salicylic acid compounds. I attribute this to a synergistic action of the two components of my new compound, quinine and salicylo-salicylic acid. My explanation is that the two drugs in a number of respects supplement each other in their actions, both producing similar results as antipyretics, bactericides and analgesics, although acting in different manner or on different centers of the body. Partly I attribute the beneficial action of my new compound also to its relative insolubility in water, which fact causes its absorption by and elimination from the system to be slower and consequently its effect to be more prolonged than would be the case were the compound water-soluble as is quinine sulfate for example. A valuable consequence of this reduction of the required amount of the medicament is that digestive disturbances and other discomforting symptoms so often accompanying quinine treatments are not noticed or are at least greatly reduced.

Moreover, through the choice of salicylo-salicylic acid as the salicylic acid derivatives my new compound does not cause the disagreeable gastric irritation which so frequently follows the administration of salicylates, as the salicylo-salicylic acid radical is not affected by dilute acids and consequently is not split up into salicylic acid by the action of the acid gastric juices as is the case for example with acetyl salicylic acid.

The process by which I prefer to prepare the new compound is as follows:

I dissolve 5.48 parts of quinine bisulfate ($QuH_2SO_4$) in 50 parts water at room temperature or about 25°C. To this I add under stirring a cold solution of 5.16 parts salicylo-salicylic acid in 50 parts of water containing 0.8 parts sodium hydroxide. After all has been added I continue stirring for several hours. The product is then filtered, washed and dried carefully first at room temperature and then at a temperature gradually rising to, but not exceeding 60° C. While this is the method I prefer to use, it is understood that for quinine bisulfate may be substituted any solution containing an equivalent amount of any other acid quinine salt, e. g. quinine dihydrochloride or a mixture of such. Or, an equivalent of a neutral salt of quinine, e. g. quinine sulfate may be used, provided that an equivalent of acid, e. g. sulfuric acid, is added to the solution, so that a solution of an acid quinine salt results. It will also be understood that the salicylo-salicylic acid solution may be prepared by dissolving in various alkaline solutions such as those of the alkali carbonates, hydroxides, ammonium hydroxide etc., without affecting the final result.

The compound made in accordance with my invention is of therapeutic purity; that is, it is of a purity compatible with therapeutic use.

I claim:
1. As a new compound, quinine bisalicylo-salicylate.
2. As a new compound, quinine bisalicylo-salicylate of therapeutic purity.
3. The process of making quinine bisalicylo-salicylate which consists in bringing together in aqueous solution an acid quinine salt and a soluble salt of salicylo-salicylic acid and maintaining the temperature below about 25° C. during the reaction.
4. The process of making quinine bisalicylo-salicylate which comprises bringing together in aqueous solution an acid quinine salt and a soluble salt of salicylo-salicylic acid, and stirring the mixture for several hours while maintaining the temperature below about 25° C.
5. The process of making quinine bisalicylo-salicylate, suitable for therapeutic use, which comprises bringing together at room temperature solutions of one equivalent of an acid quinine salt and of two equivalents of a soluble salt of salicylo-salicylic acid, stirring for several hours, filtering, washing with cold water on the filter, drying carefully first at room temperature, and gradually raising the temperature to not over 60° C.
6. The process which comprises bringing together in aqueous solution one molecule of quinine sulfate, one molecule of a mineral acid and two molecules of the sodium salt of salicylo-salicylic acid while maintaining the temperature below about 25° C.

WILLIAM H. ENGELS.